(12) United States Patent
Riemer et al.

(10) Patent No.: US 7,198,084 B2
(45) Date of Patent: Apr. 3, 2007

(54) DUAL PURPOSE TIRE WRAP

(76) Inventors: Marilyn Tiffany Riemer, P.O. Box 2708, Helendale, CA (US) 92342;
Michael Scott Riemer, P.O. Box 2708, Helendale, CA (US) 92342

( * ) Notice: Subject to any disclaimer, the term of this patent is extended or adjusted under 35 U.S.C. 154(b) by 90 days.

(21) Appl. No.: 10/912,669

(22) Filed: Aug. 6, 2004

(65) Prior Publication Data

US 2006/0027297 A1    Feb. 9, 2006

(51) Int. Cl.
*B60C 27/00*    (2006.01)
(52) U.S. Cl. ........................ 152/221; 152/187
(58) Field of Classification Search .............. 301/38.1, 301/40.1, 40.3, 41.1, 44.2, 44.3; 305/7, 19; 152/221, 222, 516, 185.1, 187
See application file for complete search history.

(56) References Cited

U.S. PATENT DOCUMENTS

| | | | | |
|---|---|---|---|---|
| 2,540,230 A | * | 2/1951 | Andrews | ............... 152/218 |
| 2,782,494 A | * | 2/1957 | Gordon | ............... 152/221 |
| 4,287,925 A | * | 9/1981 | Spann | ............... 152/221 |
| 4,862,935 A | * | 9/1989 | Goto | ............... 152/213 A |
| 5,004,030 A | * | 4/1991 | McLaughlin | ............ 152/225 R |
| 5,009,256 A | * | 4/1991 | Smith | ............... 152/221 |
| 6,708,746 B2 | * | 3/2004 | Wilkinson | ............... 152/221 |
| 6,877,819 B1 | * | 4/2005 | Kwak | ............... 301/38.1 |

* cited by examiner

*Primary Examiner*—Jason R. Bellinger
(74) *Attorney, Agent, or Firm*—Holland & Knight LLP; Richard E. Lyon, Jr.

(57) ABSTRACT

A dual purpose automotive tire apparatus for alternatively supporting a vehicle's tire and/or rim in the event of a flat tire or providing enhanced traction for a vehicle on a slippery road surface. The apparatus includes a pair of elongated flexible retaining members defining extended end portions, a plurality of evenly spaced support members carried by and extending laterally between the retaining members and each defining a first surface providing a tread and second surface providing a traction element. Attachment members are provided for joining the extended end portions of the retaining members together about the vehicle tire and/or rim such that the first surfaces collectively project outwardly therefrom for supporting said tire and/or rim in the event of a flat tire or such that the second surfaces collectively project outwardly therefrom for providing traction on a slippery surface.

9 Claims, 4 Drawing Sheets

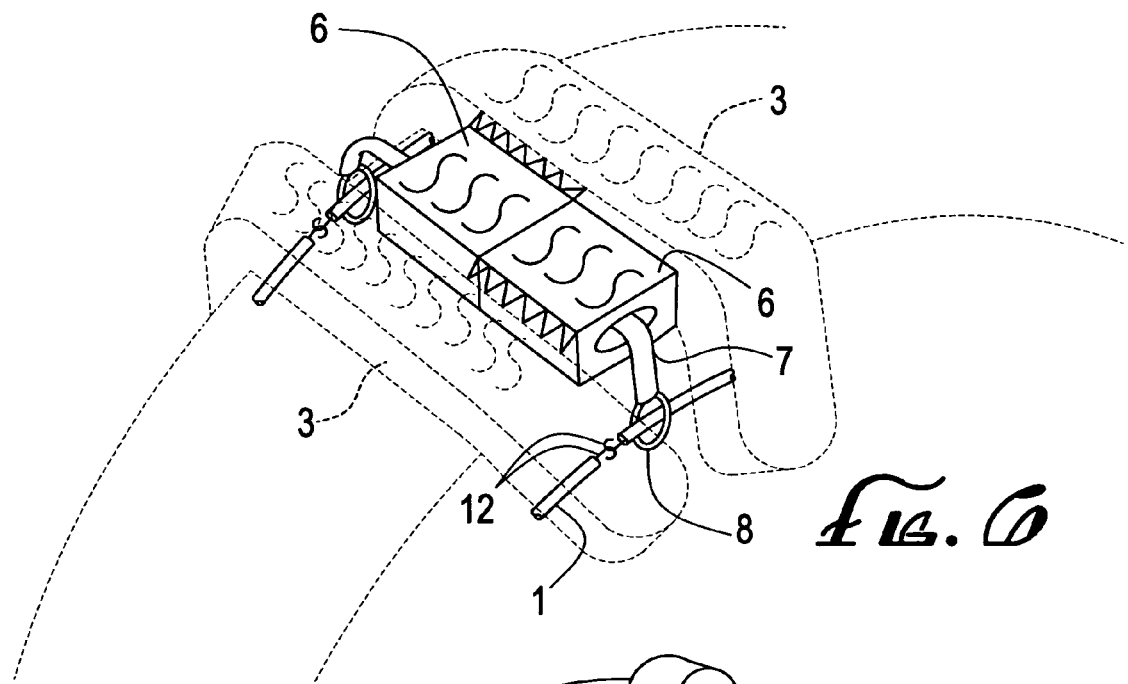
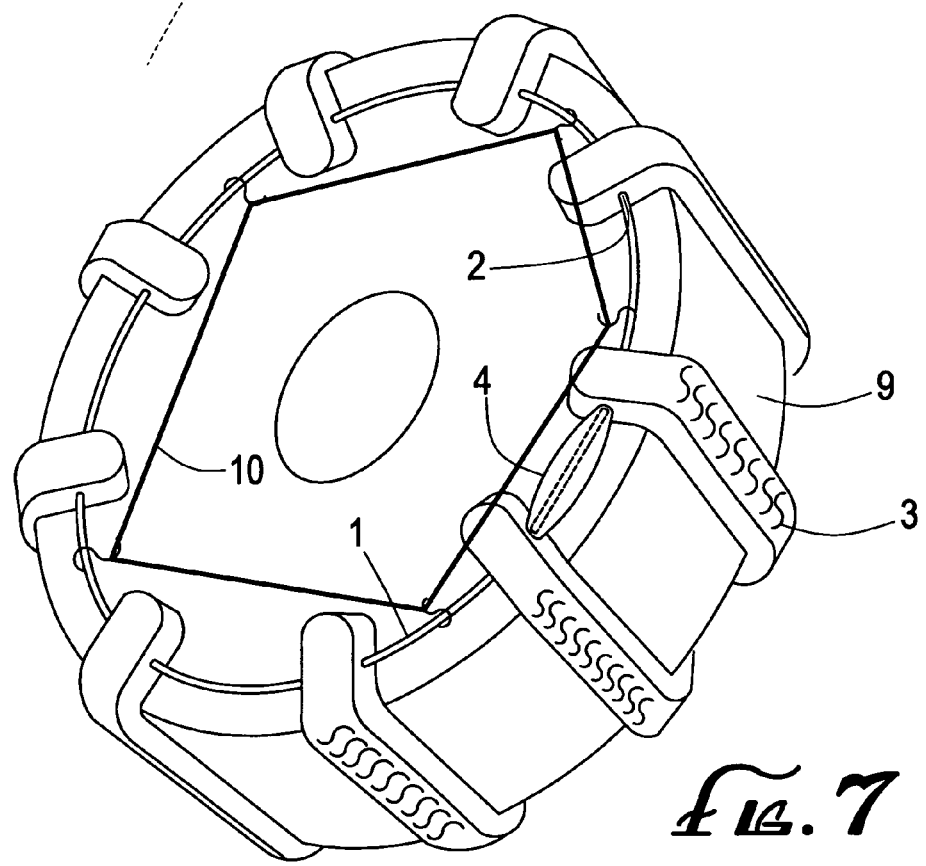

DUAL PURPOSE TIRE WRAP

FIELD OF THE INVENTION

The present invention pertains to the occurrences of flat tires, and provides a means by which a vehicle can quickly become roadworthy without the use of a spare tire. Additionally, the present invention can double as a traction apparatus to assist vehicles in snowy, icy, or other inclement conditions. There have been some efforts that are used as preventive measures for flat tires, such as run-flat devices, but if not pre-installed, such a device is useless in a post-blowout event. The present invention solves the problem and hassle of wheel replacement, without having to incur the extra expense of having countermeasures, such as a run-flat device, affixed to every wheel. The device of the present invention only is used on an "as-needed" basis, and accordingly, will offer an attractive solution as a flat tire and traction assistance device to motorists.

BACKGROUND OF THE INVENTION

Ever since the inception and broad use of the pneumatic automotive tire, a flat tire is an experience that every motorist dreads. One must loosen the lug nuts, use a jack-type device to lift the vehicle, haul the spare tire from its storage position, remove the disabled or damaged tire and wheel, replace it with the spare tire, tighten all the lug nuts to torque specs, and then one must physically place the defective tire and wheel back in the vehicle. This process includes much physical work because the entire wheel is being replaced. The present invention provides a means by which the disabled corner of the vehicle can become operational without having to jack the vehicle up, and without having to replace the wheel rim with an undamaged tire. Furthermore, by incorporating a traction assist mechanism to the present invention, we have a device which makes itself useful for many different circumstances aside from the flat tire or blowout scenario.

SUMMARY OF THE INVENTION

The current invention assists in making a vehicle driveable after the unfortunate event of a flat-tire, or worse yet, a complete blowout. These aims are accomplished by having several connected panels, treaded on both sides, made of a flexible material, such as rubber or an elasticized plastic, configured to form a lattice or ladder shaped network which when wrapped around and secured to a wheel rim (with or without a tire present) acts together to mimic the characteristics of a conventional tire. There are three primary objectives for the panels.

The first objective is to have an alternative tread surface, so the device can provide sufficient road surface traction, just as a tire. When properly installed, a vehicle will be able to stay in motion, despite a disabled tire.

The second objective is to provide adequate ground clearance for the vehicle. Since the device acts as a cushion, the device performs a double-duty by both restoring a vehicle to a standard ride height, and also, the cushioning prevents wheel rim damage.

The third objective is to use the opposite side of the panel to incorporate traction assist elements for inclement weather. By incorporating chain, cable, studs, or other traction elements to one side of the support member (tread panel), the present invention is capable of assisting a vehicle through ice, snow, or a variety of other adverse conditions which warrant the use of such aftermarket devices.

When considering the unpredictability of a tire's behavior when stressed from heat, cold, under-inflation, over-inflation, extreme driving maneuvers, or perhaps a puncture or other type of stress from road debris, there is no way of knowing whether such behavior will cause a mere flat, which will still leave a tire in a salvageable state, or a complete blowout, in which a tire has completely separated from the wheel rim. In the case of a flat tire or blowout, the present invention can either be used to envelope a disabled tire, or if a tire has been torn apart from the rim, then the present invention can be installed directly to the wheel rim. As a traction assist device, the present invention can be installed onto a fully inflated wheel/tire combination. Since support members (tread panels) can be added or removed, the device can be scaled for most any application.

BRIEF DESCRIPTION OF THE DRAWINGS

It is, of course, to be understood that the present invention is, by no means, limited to the specific showing in the drawings but also comprises any modifications within the scope of the appended claims.

FIG. 6 is an enlarged detailed perspective view of the closure mechanism of the embodiment of the invention illustrated in FIG. 5.

FIG. 7 is a perspective view of the sidewall of the wheel, after the apparatus has been installed, illustrating the use of an additional tightening device.

DETAILED DESCRIPTION OF THE PREFERRED EMBODIMENTS

Figure 4:
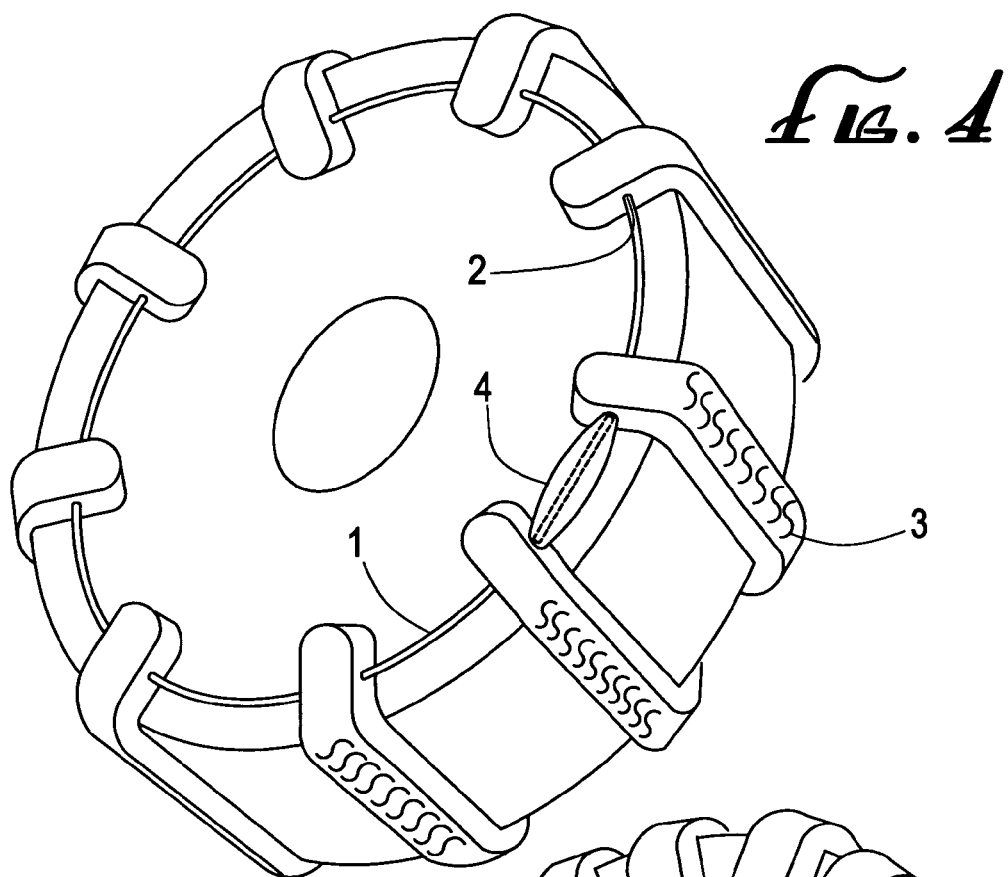
FIG. 4 is a perspective view of the wheel with the panels arranged around a wheel and the retaining members threaded through the passage apertures in the support members.

It is the object of the invention to provide an apparatus which wraps around a tire or wheel rim 9 to provide a substitute tread 3 in the event of a flat tire or blowout. The present invention includes several support members 3, treaded on both sides, made of rubber or elasticized plastic and forming a network, which when distributed and secured over the surface area of a tire or wheel rim 9 by means of retaining members 1, acts as a substitute tire, thereby rendering the disabled vehicle operable again. Along the longitudinal edge portions of each support member 3 (tread panel), passage apertures 2 are provided which will provide a means for networking the support members and securing the device to the wheel rim 9. Each support member 3 covers a portion of the tire or wheel rim, while longitudinally overlapping onto the sidewalls, where the passage apertures 2 assist in securing the device. When the retaining member 1 is properly threaded through the passage apertures 2 in the support members, the members are uniformly spaced apart and transverse the tire and/or rim as shown, for example, in FIGS. 4 and 5, and the extended ends of the tire wrap device are adequately secured by means of a closure device, the resulting network will provide an efficient means to make a vehicle roadworthy.

A variety of materials can be used as retaining members 1 to retain the tire wrap device through the use of the aforementioned apertures 2, including, but not limited to, chain, cable, bungee, or rope. Then, in order to secure the device, an assortment of suitable closure devices 12 can be used, including, but not limited to, hooks, caribiners, or latches.

It is a further object of the invention to provide an apparatus that will assist in restoring ride height to a vehicle that has experienced a flat tire or blowout. Since the present invention cushions the wheel rim 9, ride height can be restored to a reasonable level, and furthermore, the cushioning of the support members 3 will protect the wheel rim from being damaged.

Figure 1:
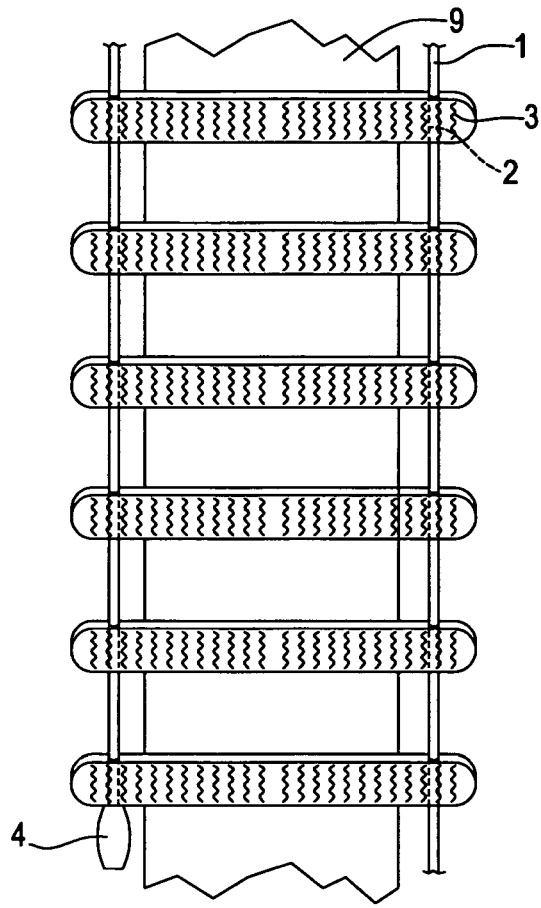
FIG. 1 is a perspective view of a portion of the present invention, as laid out prior to installation.
Figure 3:
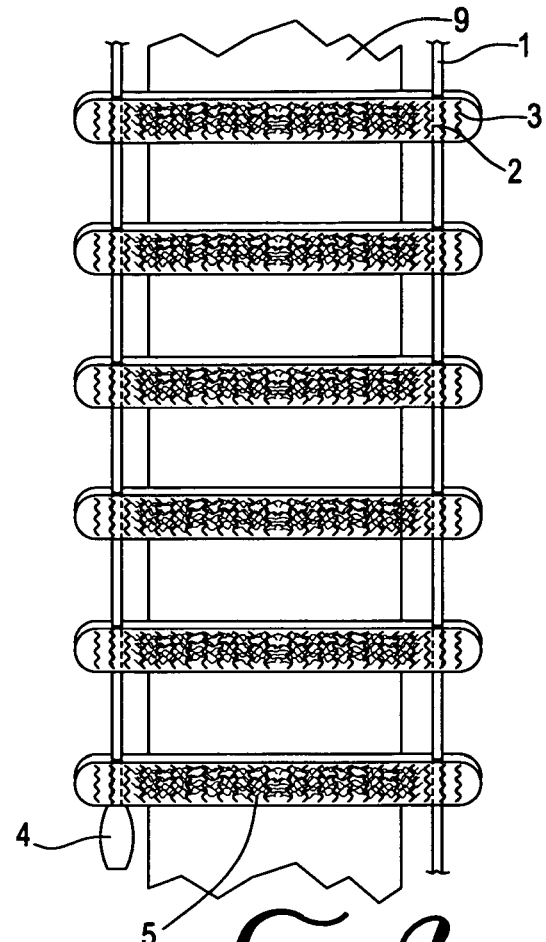
FIG. 3 is a perspective view of the reverse side of a plurality of the support members, where traction assist elements have been embedded into the tread panels.
Figure 2:
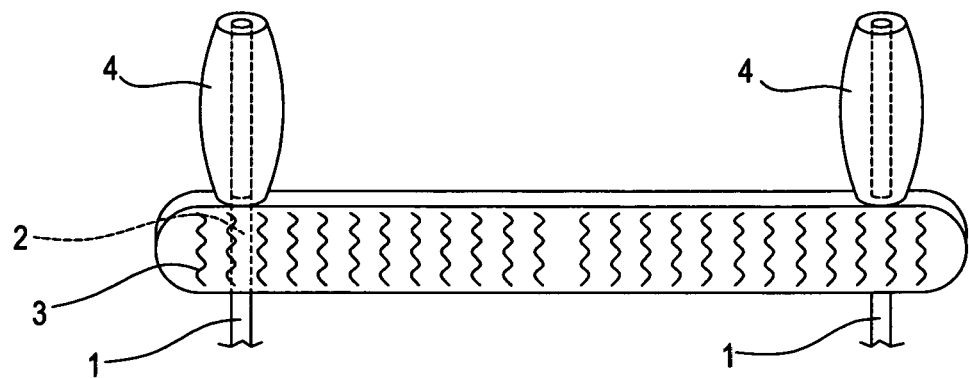
FIG. 2 is a perspective view of one support member of the present invention conjoined by threading of the retaining member through the passage apertures therein. This also shows an alternate design feature, in which spacers are placed between the support members, along the retaining member, thereby creating a buffer between support members (tread panels), which will assist in limiting sliding of the support members along the retaining member. Additionally, these spacers will provide a fixed distance between support members.

It is yet another object of the invention to provide an apparatus that will assist vehicular motion through adverse conditions by enhancing traction characteristics. This is accomplished by incorporating traction assist elements 5 (see FIG. 3), such as chain, cable, or studs to the reverse side of the support member 3, between the wheel rim edges.

In order to install the device, one must either lay the support network down on the ground, and then drive over the device, or one can drape the device over a wheel, then move the car slightly to fully cover the surface area. Once the device is entirely covering the wheel, the ends of the retaining members 1 must be brought together, and the device must then be secured as mentioned above before driving.

As an alternative design, spacers 4 can be placed between the support members to provide a fixed uniform distance between panels, and to prevent lateral movement of tread panels. In the embodiment illustrated in the drawings, elongated channels 11 are provided in the spacers such that the retaining members can extend therethrough.

Figure 5:
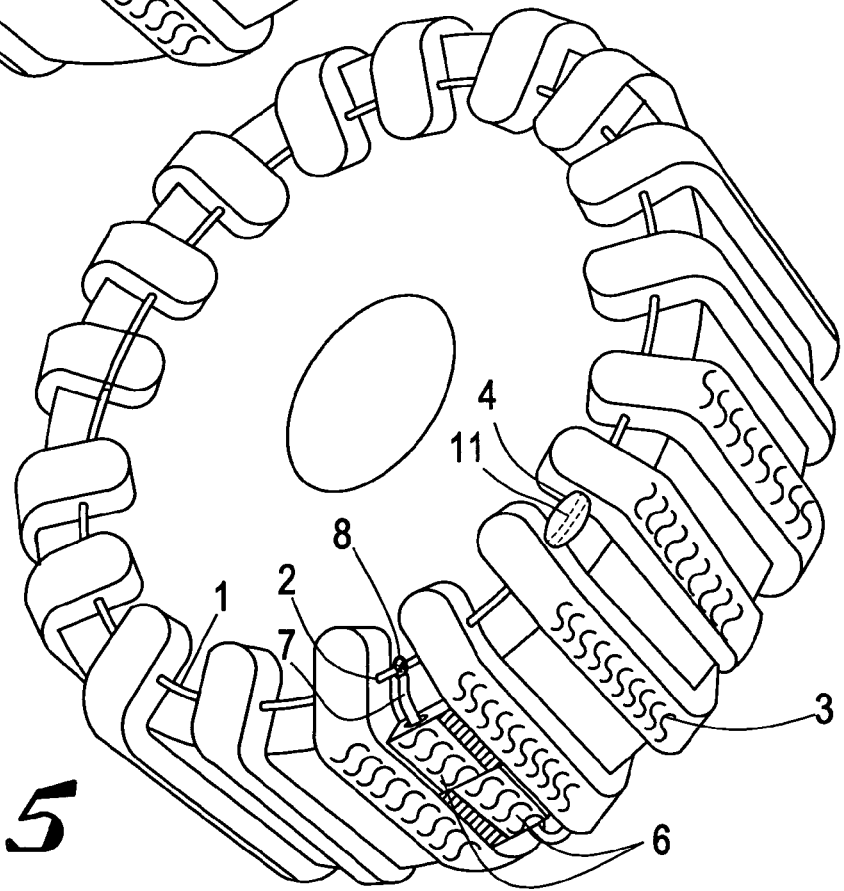
FIG. 5 is a perspective view of an alternate embodiment of the present invention wrapped about and secured to an automotive wheel by means of a closure mechanism that includes two shortened and hollow partial support members, one of which is affixed to each end of the apparatus such that when the ends of the apparatus are brought together about the wheel, the partial support members are axially aligned, and can be secured by a retaining pin.
Figure 8:
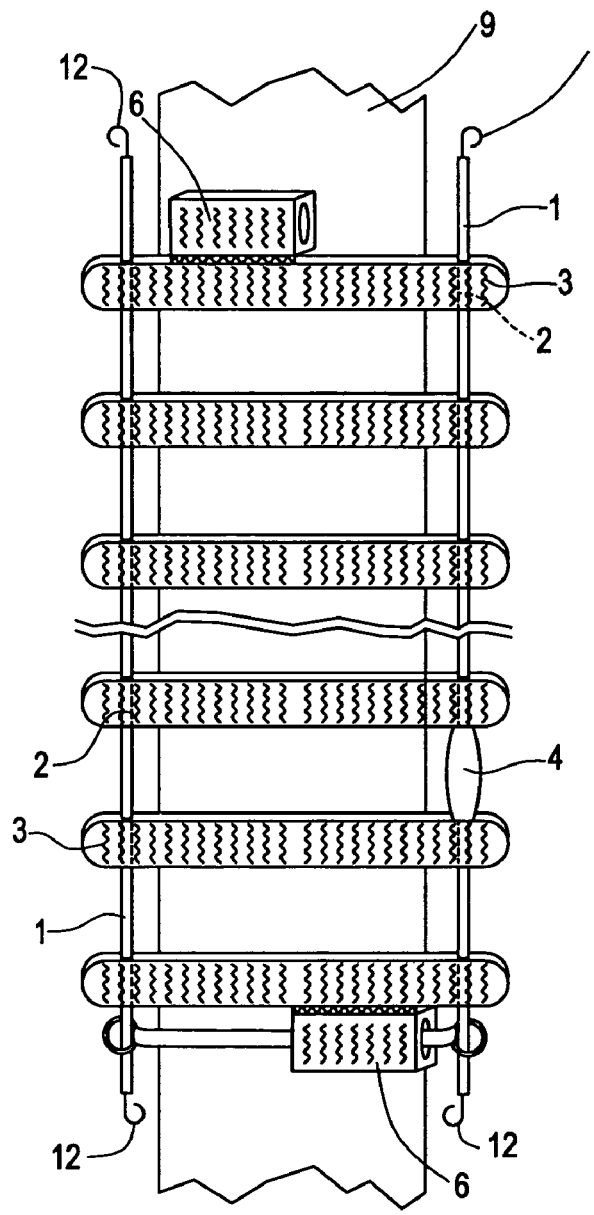
FIG. 8 is a perspective view of a portion of the embodiment of the invention illustrated in FIG. 5 wherein the two ends of the device are arranged to meet when wrapped around the tire.
Figure 9:
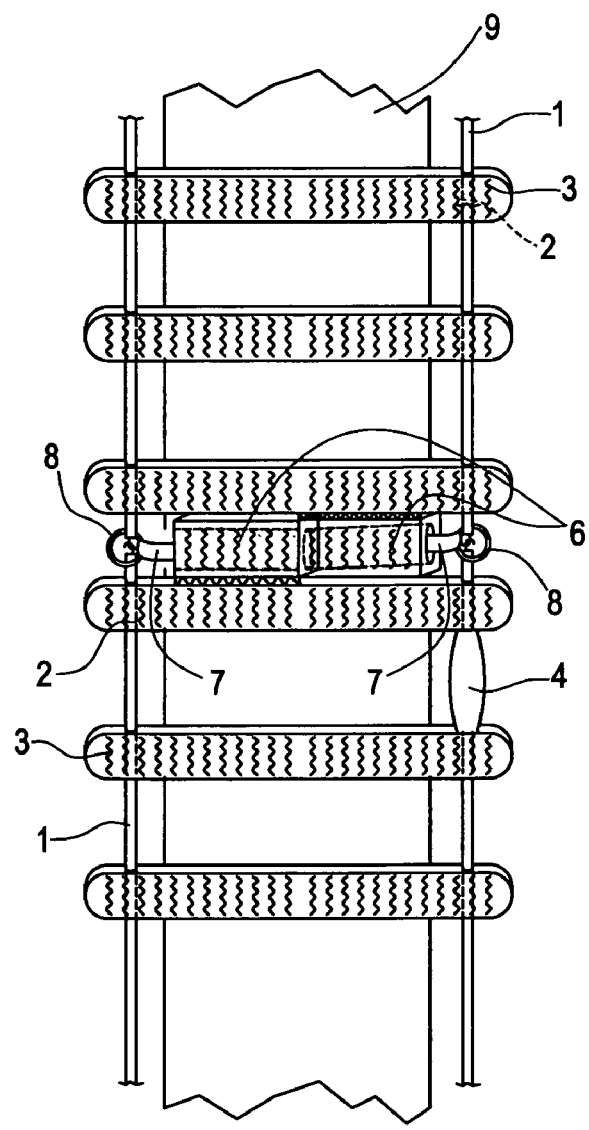
FIG. 9 is a perspective view of a portion of the embodiment of the invention illustrated in FIG. 5 illustrating the method of closure where two shortened and hollow partial support members are aligned to form one support member, then secured by the retaining pin which is provided with eyelets at both ends so that the retaining members of the device can be threaded through the eyelets and thereby secure that support member in position in the network.

In an alternate embodiment of the tire wrap of the present invention (see FIGS. 5, 6, 8 and 9), two hollow partial support members 6 are provided at opposite sides of and on opposite ends of the device. When the tire wrap device is wrapped about the tire, the hollow shortened support members will align, allowing a retaining pin 7 to be inserted therethrough (see FIG. 6) to secure the two partial support members together and with the hooks or other closure devices 12 provided on the extended ends of the tire wrap device, secure together the extended ends of the device of the present invention as shown in FIG. 9. So secured, the axially aligned partial support members effectively define an additional support member 3. Like the other support members, the shortened partial support members can be provided with treads as shown in FIGS. 5 and 6. Furthermore, the retaining pin 7 is provided with eyelets at both ends 8, to facilitate the passage of the retaining member 1 therethrough along with the other passage apertures 2 of the other support members 3. To further secure the tire wrap device, an aftermarket tightening device 10 can be fastened to the apparatus as shown in FIG. 7.

We claim:

1. A dual purpose automotive tire apparatus for supporting a vehicle's tire and/or rim in the event of a flat tire and providing enhanced traction for a vehicle on a slippery road surface, said apparatus comprising a pair of laterally-spaced elongated flexible retaining members defining extended end portions, a plurality of support members carried by and extending laterally between said retaining members, said support members each defining opposed first and second surfaces, said first surfaces each providing a tread and said second surfaces each providing a traction element and means for selectively joining together said extended end portions of each of said retaining members about a vehicle tire and/or rim such that said support members extend thereacross either with said first surfaces collectively projecting outwardly therefrom for supporting said tire and/or rim in the event of a flat tire or with said second surfaces collectively projecting outwardly from the tire for providing traction on a slippery surface, said joining means including a pair of attachment elements, said attachment elements being disposed proximate opposite end portions of said retaining members and defining channels extending therethrough such that said channels are in axial alignment upon said extended end portions being joined together and including a pin member extending through said aligned channels and being operatively connected to said retaining members.

2. The apparatus of claim 1 wherein said attachment elements are each configured so as to define a shortened portion of one of said support members with one of said channels extending longitudinally therethrough, said attachment elements upon alignment collectively defining a length less than the lateral spacing between said flexible retaining members.

3. The apparatus of claim 1 wherein said attachment elements are each secured to an outer lateral portion of a support member disposed proximate opposite extended ends of said retaining members.

4. The apparatus of claim 1 wherein said attachment elements each define opposed first and second surfaces, said first surfaces on said attachment elements each providing a tread and being disposed adjacent one of said first surfaces of one of said support members and said second surfaces on said attachment elements each defining a traction element and being disposed adjacent a second surface of another of said support members.

5. The apparatus of claim 1 wherein said means for joining together said extended end portions of said retaining members comprise hook portions defined by said extended end portions of said retaining members.

6. The apparatus of claim 1 including spacer elements disposed on said elongated flexible retaining members between said support members for substantially equidistantly disposing said support members along said flexible retaining members.

7. The apparatus of claim 2 wherein said attachment elements are each secured to an outer lateral portion of a support member disposed proximate opposite extended ends of said retaining members.

8. The apparatus of claim 3 wherein said attachment elements each define opposed first and second surfaces, said first surfaces on said attachment elements each providing a tread and being disposed adjacent one of said first surfaces of one of said support members and said second surfaces on said elements each defining a traction element and being disposed adjacent a second surface of another of said support members.

9. The apparatus of claim 7 wherein said attachment elements each define opposed first and second surfaces, said first surfaces on said attachment elements each providing a tread and being disposed adjacent one of said first surfaces of one of said support members and said second surfaces on said elements each defining a traction element and being disposed adjacent a second surface of another of said support members.

* * * * *